(12) United States Patent
Guiassa et al.

(10) Patent No.: US 11,921,487 B2
(45) Date of Patent: Mar. 5, 2024

(54) SYSTEM AND METHOD FOR MACHINING A COMPONENT

(71) Applicant: Pratt & Whitney Canada Corp., Longueuil (CA)

(72) Inventors: Rachid Guiassa, Longueuil (CA); Mizanur Rahman, Saint-Hubert (CA); Pierre-Alexandre Lafreniere, Brossard (CA); Martin Perron, Candiac (CA); Luc Sauve, Varennes (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/675,774

(22) Filed: Feb. 18, 2022

(65) Prior Publication Data

US 2023/0266736 A1    Aug. 24, 2023

(51) Int. Cl.
*G05B 19/401* (2006.01)

(52) U.S. Cl.
CPC .. *G05B 19/401* (2013.01); *G05B 2219/35478* (2013.01)

(58) Field of Classification Search
CPC ................ G05B 19/401; G05B 19/402; G05B 19/4097; G01B 5/008
USPC ...................... 700/61, 96, 174–176, 193, 195
See application file for complete search history.

(56) References Cited

U.S. PATENT DOCUMENTS

| | | | | |
|---|---|---|---|---|
| 4,819,195 A | * | 4/1989 | Bell | G01B 7/008 318/632 |
| 4,945,501 A | * | 7/1990 | Bell | G01B 21/045 318/632 |
| 6,161,079 A | * | 12/2000 | Zink | G01B 21/04 33/503 |
| 6,519,860 B1 | * | 2/2003 | Bieg | B23H 7/26 73/1.79 |
| 8,577,495 B2 | | 11/2013 | Gu | |
| 9,921,571 B2 | | 3/2018 | Crowley | |
| 10,295,341 B2 | | 5/2019 | Garvey | |
| 10,639,734 B2 | | 5/2020 | Ferry | |
| 10,955,815 B2 | | 3/2021 | Auxier | |
| 11,219,961 B2 | | 1/2022 | Mitsuyasu | |

(Continued)

OTHER PUBLICATIONS

EP search report for EP23157643.0 dated Jun. 29, 2023.

*Primary Examiner* — Ronald D Hartman, Jr.
(74) *Attorney, Agent, or Firm* — Getz Balich LLC

(57) ABSTRACT

A system and method for manufacturing a component is provided that includes a CNC machine tool, a correction module, and a system controller. The CMM module is controllable to determine a set of multi-axis coordinates surface points on the component. The correction module is in communication with the CMM module and stored reference inspection data. The system controller is in communication with the CNC machine tool, the correction module, and stored instructions. The instructions when executed cause the system controller to: a) control the CNC machine tool to modify a surface of the component; b) control the CMM module to determine multi-axis coordinates for surface points; c) determine surface position variances using the reference inspection data and the multi-axis coordinates; d) determine if surface position variances exceed a threshold; and e) create correction action instructions for controlling the CNC machine if surface position variances exceed the threshold.

15 Claims, 7 Drawing Sheets

(56) References Cited

U.S. PATENT DOCUMENTS

| | | |
|---|---|---|
| 2012/0215341 A1* | 8/2012 | Gu .................... G05B 19/4083 700/173 |
| 2014/0257542 A1* | 9/2014 | Li ....................... G05B 19/404 700/97 |
| 2014/0257543 A1 | 9/2014 | Rhodes |
| 2015/0205283 A1* | 7/2015 | Brand .............. G05B 19/40937 700/186 |
| 2016/0175955 A1* | 6/2016 | Ferry .................. G05B 19/182 700/110 |
| 2016/0202691 A1* | 7/2016 | Pettersson ........ G05B 19/41865 700/98 |
| 2018/0136626 A1 | 5/2018 | Gu |
| 2019/0011327 A1 | 1/2019 | Phommasith |
| 2020/0332877 A1 | 10/2020 | Landvogt |
| 2021/0078126 A1 | 3/2021 | Steinkopf |
| 2021/0132568 A1 | 5/2021 | Tang |
| 2022/0184765 A1 | 6/2022 | Maxted |

\* cited by examiner

SYSTEM AND METHOD FOR MACHINING A COMPONENT

BACKGROUND OF THE INVENTION

1. Technical Field

The present disclosure relates to systems and methods for machining a component in general, and to systems and methods for machining a component using a computer numerical control machining device having a coordinate measuring component.

2. Background Information

Computer numerical control or "CNC" machine tools are computer controlled devices that can be operated based on stored software instructions. The software instructions or "programming" control the CNC machine tool to produce the desired component. Even the most tightly controlled machining processes will inherently include some dimensional variability. A variety of different things can cause dimensional variability. For example, there may be positional variability between the machine tool and the work piece, or a machine tool bit can dimensionally alter over time due to wear or damage or the like. Hence, it is often necessary to inspect the component periodically during the manufacturing process to ensure the machining process is within specification and a finished component within acceptable tolerances can be produced.

Historically, manufacturing processes included manually inspecting a component being formed into a component to determine whether the component was within specified dimensional tolerances at certain points in the manufacturing process. In some instances, these inspection processes involved the use of manual gages and/or measuring devices (e.g., over-wire gages, micrometers, etc.). In some instances, these inspection processes involve the use of a coordinate measuring machine (CMM) that may be configured to inspect the component while the component is mounted in the machine tool or may require the component be removed from the machine tool during inspection. These historical inspection processes are generally acceptable but are almost always time consuming, disruptive to the machining process, and add cost to the process. In addition, very often a skilled technician must perform these inspection processes. Even with a skilled technician, however, these inspection techniques involve human intervention and therefore increase the potential for error. Nevertheless, these inspection processes often represent the current practice.

After a component has been inspected with these known inspection processes, the component will either be within specification and machining can proceed according to the stored instructions or the component will be out of specification and corrective action is required. The corrective action is required because continued machining of the component by the CNC machine tool according to the stored instructions may not result in a finished component within acceptable tolerances. Historically, corrective actions were often chosen by a skilled machine tool operator based on his experience regarding the inspection process (e.g., the type of gage used, etc.) and the degree to which the component is nonconforming. Issues associated with this approach include the facts that skilled, experienced machine tool operators are required to identify and implement corrective actions, even skilled operators are subject to human error, and as stated above the entire process can greatly increase the processing time and therefore the cost of producing the component.

What is needed is a system and/or method that is able to use a machine tool component measurement machine to determine dimensional compliance, one that is capable of inspecting a component without removing the component from the machine tool, and one that provides a methodology that can be used to identify any corrective action required to produce the component within acceptable tolerances.

SUMMARY

According to an aspect of the present disclosure, a system for manufacturing a component is provided that includes a computer numerical control (CNC) machine tool, a correction module, and a system controller. The CNC machine tool has a machining module selectively controllable to machine the component and a coordinate measuring machine (CMM) module that is selectively controllable to determine a set of multi-axis coordinates for one or more surface points on the component. The correction module is in communication with the CMM module and is in communication with stored reference inspection data relating to the component. The system controller is in communication with the CNC machine tool, the correction module, and non-transitory memory storing instructions. The instructions when executed cause the system controller to: a) control the CNC machine tool to modify at least one surface of the component; b) control the CMM module to determine multi-axis coordinates for the one or more surface points on the modified surface of the component; c) determine one or more surface position variances using the multi-axis coordinates for the one or more surface points on the modified surface and the reference inspection data; d) determine if any of the one or more surface position variances exceed a tolerancing threshold; and e) using the correction module, create one or more executable correction action instructions for controlling the CNC machine if the one or more surface position variances exceed the tolerancing threshold.

In any of the aspects or embodiments described above and herein, the correction action instructions when executed may control the CNC machine to secondarily modify the modified surface of the component to produce a secondarily modified surface of the component that is within the tolerancing threshold.

In any of the aspects or embodiments described above and herein, the stored reference inspection data relating to the component may include a set of multi-axis coordinates for one or more surface points on at least one reference component produced using the CMM module correlated with dimensional data relating to the at least one reference component produced using a gaging process.

In any of the aspects or embodiments described above and herein, the gaging process may include an over-wire measurement process.

In any of the aspects or embodiments described above and herein, the gaging process may include using a coordinate measuring machine independent of the CNC machine tool.

In any of the aspects or embodiments described above and herein, the CNC machine may be a CNC milling machine.

In any of the aspects or embodiments described above and herein, the instructions when executed that cause the system controller to control the CNC milling machine may include controlling the CNC milling machine to remove material from the component and thereby produce the modified surface of the component.

In any of the aspects or embodiments described above and herein, the correction action instructions may be operable to modify a tool path followed by a cutting tool of the CNC milling machine.

In any of the aspects or embodiments described above and herein, the instructions when executed may cause the system controller to control the CNC milling machine to produce a male spline member having a plurality of circumferentially disposed male spline member grooves and male spline member teeth.

In any of the aspects or embodiments described above and herein, the instructions when executed may cause the system controller to repeatedly control the CNC machine tool to modify the at least one surface of the component, and control the CMM module to determine said multi-axis coordinates for the one or more surface points for each modified surface, and determine the one or more surface position variances on each respective modified surface using the multi-axis coordinates for the one or more surface points on the respective modified surface and the reference inspection data, and determine if any of the one or more surface position variances for the respective modified surface exceeds the tolerancing threshold, and using the correction module, create the one or more executable correction action instructions for controlling the CNC machine.

According to another aspect of the present disclosure, a method for manufacturing a component using a computer numerical control (CNC) machine tool is provided. The CNC machine tool includes a machining module selectively controllable to machine the component and a coordinate measuring machine (CMM) module that is selectively controllable to determine a set of multi-axis coordinates for one or more surface points on the component. The method includes: (a) controlling the CNC machine tool to modify at least one surface of the component; (b) controlling the CMM module to determine multi-axis coordinates for one or more surface points on the modified surface of the component; (c) determining one or more surface position variances using the multi-axis coordinates for the one or more surface points on the modified surface and stored reference inspection data; (d) determining if any of the one or more surface position variances exceeds a tolerancing threshold; (e) creating one or more executable correction action instructions for controlling the CNC machine if the one or more surface position variances exceed the tolerancing threshold; and (f) secondarily modifying the modified surface of the component using the correction action instructions if the one or more surface position variances exceed the tolerancing threshold.

In any of the aspects or embodiments described above and herein, the step of secondarily modifying the modified surface of the component may produce a secondarily modified surface of the component that is within the tolerancing threshold.

In any of the aspects or embodiments described above and herein, the step of controlling the CNC machine tool may include controlling the CNC machine tool to remove material from the component to produce the modified surface of the component.

In any of the aspects or embodiments described above and herein, steps (a) through (f) of the method may be repeated until the at least one surface of the component is modified to a finished shape.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DISCLOSURE OF THE INVENTION

The present disclosure is directed to systems and methods for machining a component and in particular systems and methods for machining a component using a computer numerical control (CNC) machine tool. The present disclosure may be used to manufacture a variety of different components and therefore is not limited to any particular component. The present disclosure provides considerable utility in the manufacture of components having relatively complex multi-dimensional configurations. Gas turbine aircraft engines, as an example, very often include components having multi-dimensional configurations that are difficult to manufacture.

Figure 1:
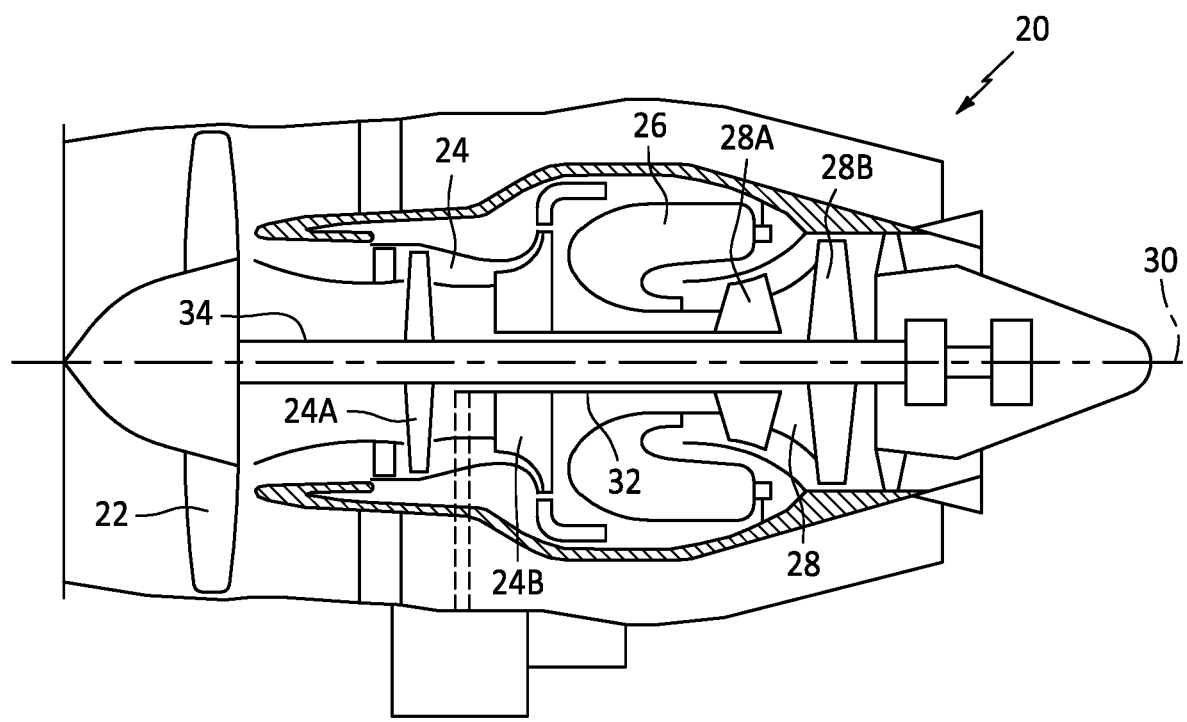
FIG. 1 is a diagrammatic sectional view of a gas turbine engine.

FIG. 1 illustrates an example of a gas turbine engine 20 having a fan 22, a compressor section 24, a combustor 26, and a turbine section 28. The compressor and turbine sections 24, 28 have rotor disks 24A, 24B, 28A, 28B that are rotatable about a central axis 30 of the gas turbine engine 20. The gas turbine engine 20 includes a high-pressure spool 32 and a low-pressure spool 34. The high-pressure spool 32 is engaged with and extends between a high-pressure portion of the turbine section 28 and a high-pressure portion of the compressor section 24. The low-pressure spool 34 is engaged with and extends between a low-pressure portion of the turbine section 28 and a low-pressure portion of the compressor section 24. In this exemplary embodiment, the high-pressure spool 32 and the low-pressure spool 34 are coaxial and rotatable about the central axis 30 of the gas turbine engine 20. Some components within the gas turbine engine 20 may be in communication with one another via a splined coupling. As indicated above, the present disclosure is directed to systems and methods for machining a variety of different component types. The gas turbine engine 20 described above is provided as a non-limiting example of a device that includes different components that vary in complexity, and that can benefit from the present disclosure. Gas turbine engine components may include gears, splined couplings, hirth couplings, curvic couplings, threads, and the like, any of which may be manufactured according to the present disclosure.

Figure 2:
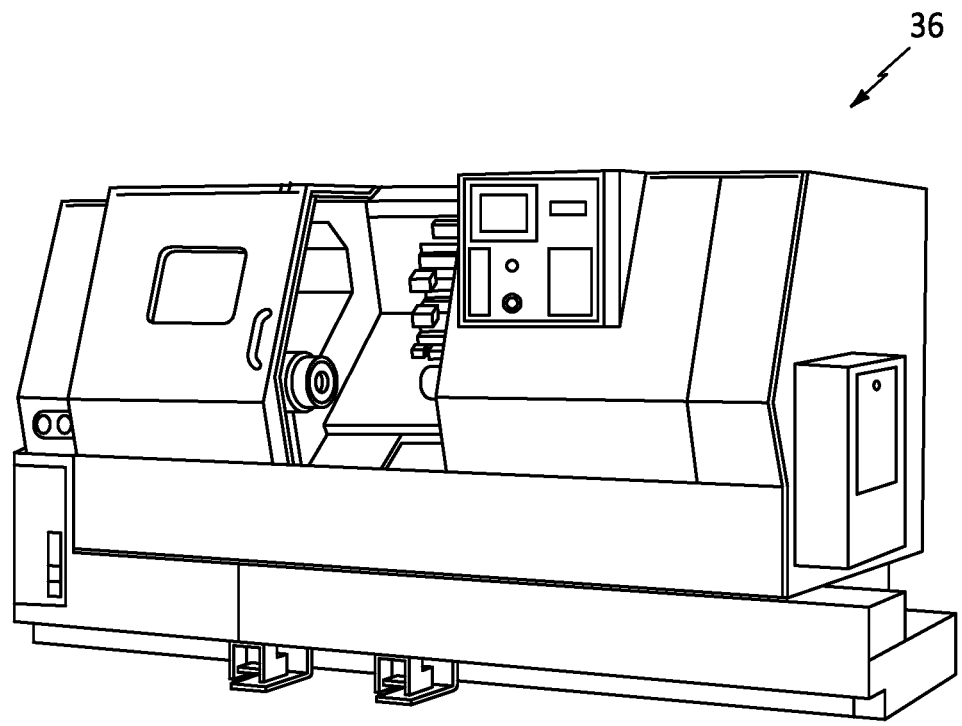
FIG. 2 is a diagrammatic view of a machine tool that may be modified according to the present disclosure.
Figure 2A:
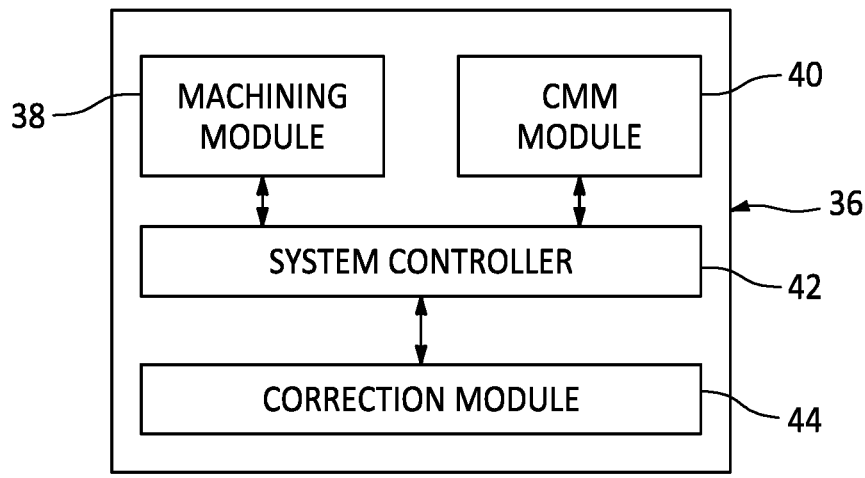
FIG. 2A is a diagrammatic representation of a machine tool that may be modified according to the present disclosure.

Referring to FIGS. 2 and 2A, embodiments of the present disclosure may include a CNC machine tool 36 adapted to perform as described herein as part of a system or may utilize such a CNC machine tool 36 within a present disclosure method. The present disclosure may be implemented with a variety of different type CNC machine tools including, but not limited to, milling machines, lathes, plasma cutters, electric discharge machines (EDMs), multi-spindle machines, wire EDMs, sinker EDMs, water jet cutters, punch presses, 3D printing equipment, and the like. The present disclosure can provide particular utility for multi-axis machine tools. The CNC machine tool may include a machining module 38, a coordinate measuring machine (CMM) module 40, and a system controller 42.

To facilitate the description provided herein, the machining module 38 will be described as a CNC milling machine as shown diagrammatically in FIGS. 2 and 2A; e.g., having a rotatable spindle for securing and powering a cutting tool, a traversable bed for securing a work piece and moving the work piece along a plurality of different axes, e.g., along an X-axis and a Y-axis. In some embodiments, the rotatable spindle may be traversable along an axis, e.g., along a Z-axis. As stated above, the present disclosure is not limited to any particular type of CNC machine tool and is therefore also not limited to particular type of milling CNC machine tool, e.g., a milling CNC machine tool utilized within the present disclosure may have more than three axes of movement.

The CMM module 40 of the CNC machine tool 36 may be configured to operate as a contact inspection device (e.g., including a physical probe) or may be configured to operate as a non-contact inspection device (e.g., laser probing or scanning, etc.). Both contact type and non-contact type inspection devices can be used to identify surface points on a component in multiple axis coordinates. The present disclosure is not limited to including any particular CMM module 40 type.

The system controller 42 is in communication with other system components such as the machining portion 38 of the CNC machine tool 36 (e.g., including the spindle, the traversable component bed, and the like), the CMM module 40, and the like. The system controller 42 may be in communication with one or more of these modules to control the operation of the module and/or to receive signals from that module to perform the functions described herein. Each of these modules may themselves include a controller that is in communication with the system controller 42. The system controller 42 (and other controllers) may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The system controller 42 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The system controller 42 may include, or may be in communication with, an input device that enables a user to enter data and/or instructions, and may include, or be in communication with, an output device configured, for example to display information (e.g., a visual display), or to transfer data, etc. Communications between the system controller 42 and other system components may be via a hardwire connection or via a wireless connection.

Embodiments of the present disclosure include a system controller 42 that is configured to include or be in communication with a correction module 44. The correction module 44 may be used by the system controller 42 in combination with input from the CMM module 40 to evaluate component characteristics (e.g., dimensional geometry, etc.) and to determine corrective actions as may be required. The term "corrective actions" as used herein, and described in greater detail below, refers to one or more instructions that deviate from (e.g., add to, modify, etc.) and/or are independent of an initial set of stored instructions executable by the CNC machine tool 36 to machine the component at hand. As will be described herein, the correction module 44 may include stored inspection data representative of actual component measurements and instructions that correlate that inspection data to component measurements produced using the CMM module 40 of the CNC machine tool 36.

The stored inspection data portion of the correction module 36 may be component specific. To illustrate, an example of stored inspection data, how it may be produced, and how it may be used as part of a corrective action is provided below in the context of a splined coupling. To be clear, the present disclosure is not limited to use in the manufacture of splined couplings.

Figure 3:
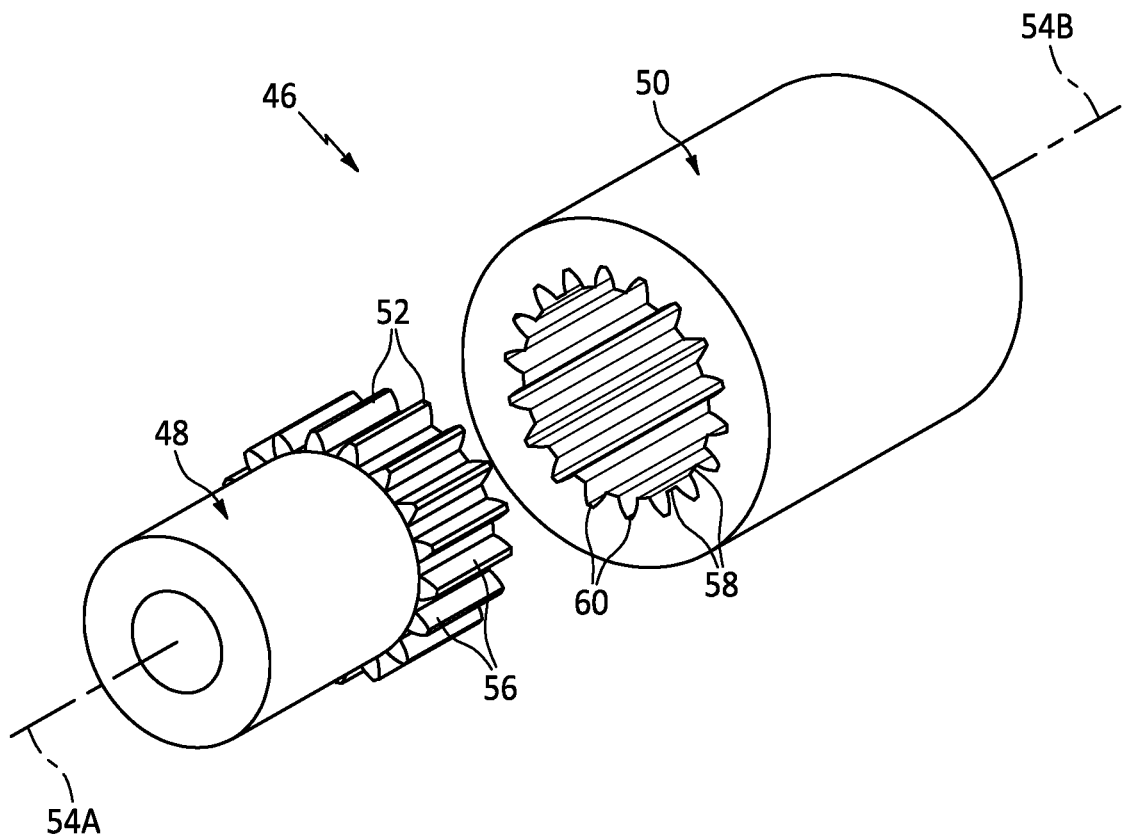
FIG. 3 is a diagrammatic perspective view of splined coupling having a male spline member and a female spline member separated from one another.

FIG. 3 shows a splined coupling 46 having a male spline member 48 and a female spline member 50 that mate with one another; e.g., the male and female spline members 48, 50 are configured so that the male spline member 48 may be received within the female spline member 50. The male spline member 48 includes a plurality of teeth 52 that extend radially outwardly from a rotational centerline of the male spline member 54A. The male spline member teeth 52 may be circumferentially uniformly distributed and spaced apart from one another. Each space disposed between a pair of adjacent male spline member teeth 52 may be referred to as a male spline member groove 56. All of the male spline member teeth 52 may be uniformly configured (e.g., same tooth geometry) and all of the male spline member grooves 56 may be uniformly configured (e.g., same groove geometry), but are not so required. In converse fashion, the female spline member 50 includes a plurality of teeth 58 that extend radially inwardly toward a rotational centerline 54B of the female spline member 50 (the rotational centerlines 54A, 54B of the male and female spline members 48, 50 are colinear when coupled). The female spline member teeth 58 may be circumferentially uniformed distributed and spaced apart from one another. Each space disposed between a pair of adjacent female spline member teeth 58 may be referred to as a female spline member groove 60. All of the female spline member teeth 58 may be uniformly configured (e.g., same tooth geometry) and all of the female spline member grooves 60 may be uniformly configured (e.g., same groove geometry), but are not so required. As indicated above, the male and female spline members 48, 50 are configured so that the male spline member 48 may be received within the female spline member 50.

Figure 4:
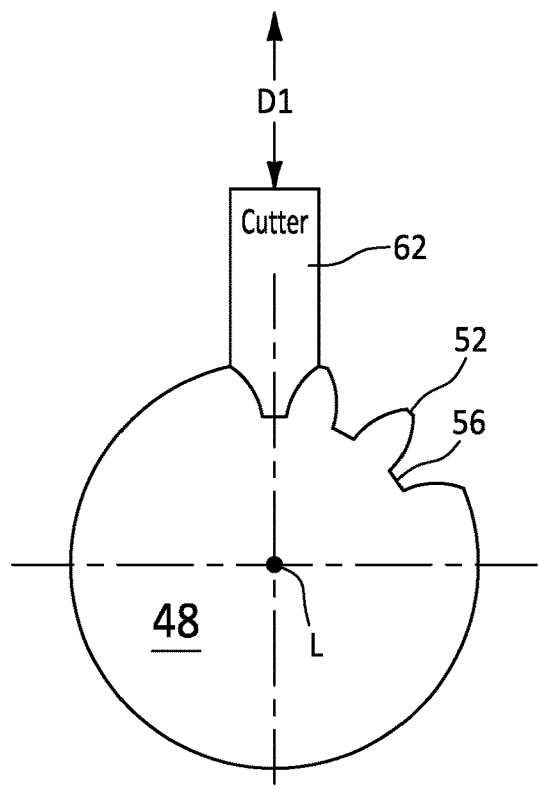
FIG. 4 is a diagrammatic view of a male spline member being manufactured with a cutting tool.
Figure 5:
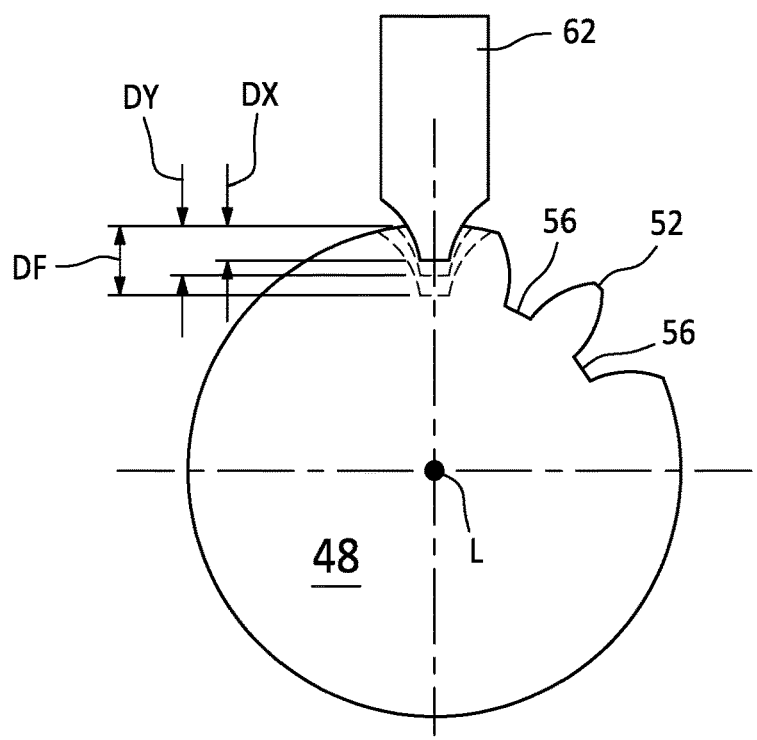
FIG. 5 is a diagrammatic view of the male spline member being manufactured with a cutting tool as shown in FIG. 4, further illustrating the cutting tool at different depths.

Referring to FIGS. 4 and 5, the male spline member teeth 52 and male spline member grooves 56 of a male spline member 48 may be machined with a cutting tool 62 having a cutting geometry that reflects a male spline member groove 56. The cutting tool 62 used to form the grooves 56 may form a portion of each adjacent male spline member tooth 52 during the groove formation process. In this diagrammatic example, the cutting tool 62 (e.g., a rotating milling bit) may be moved relative to the male spline member 48 along a direction D1, which cutting tool motion direction may be substantially radial relative to a longitudinal axis L of the male spline member 48 and in an axial direction parallel to the longitudinal axis L of the spline member 48 (i.e., along an axis perpendicular to the plane of FIGS. 4 and 5).

A spline groove machining process may include a plurality of cuts including an initial or "rough" cut at an initial depth DX. The rough cut is intended to remove a portion, but not all, of the material necessary to form the respective male spline member groove 56 (and therefore portions of each respective adjacent tooth 52). The machining process may include a plurality of additional cuts (i.e., "semi-finish cuts") each at a depth greater than the rough cut depth. FIG. 4 illustrates a single semi-finish cut at a depth "DY". These semi-finish cuts remove additional material but are not intended to arrive at the finished groove geometry. The machining process may include a final cut at a depth (DF) greater than the previous cuts that produces the desired groove geometry. It should be noted that in the manufacture of any component, additional steps (e.g., surface finishing, surface coating, etc.) may be taken beyond the machining process step described herein as a milling process to arrive at a finished form.

In the above example, reference inspection data used in the correction module may be developed using a manual gaging process. For example, reference inspection data may be produced by machining one or more "reference" male spline members 48, each accurately produced to component specification using substantially the same manufacturing steps. The number of cuts (i.e., rough cut, semi-finish cuts, final cut, etc.) may be the same as will be used during production of male spline members 48, or it may be less or more. After each cut, the geometry of the male spline member groove 56 may be inspected using a known measurement process (e.g., an over-wire gaging process pursuant to ANSI B92.1-1996, an independent CMM process, etc.), referred to hereinafter as a "gaging process." More specifically, the groove is gaged, and inspection data produced after each cut, e.g., after the rough cut, after each semi-finish cut, after the final cut, and so on. In addition, each time a male spline member groove is inspected using an existing gaging process, the same male spline member groove is inspected using the CMM module 40 of the CNC machine tool 36. For example, the CMM module 40 may be used to locate a plurality of surface points on the groove each having multi-axis coordinates. In this manner, inspection data from both the gaging process and the CMM module 40 can be linked with one another in a database as "reference inspection data" that can be included in or accessed by a correction module 44. In some embodiments, the reference inspection data can be used to produce a digital model of a portion or all of a component (e.g., a male spline member 48) at each machining step and may be correlated with a digital model of the finished component.

To ensure accuracy and repeatability, the CMM module 40 of the CNC machine tool 36 may be calibrated prior to being used to produce inspection data for the correction module, e.g., by sensing a gauge block or other technique. Calibration techniques for CMM's are known and therefore no further detail will be provided.

To be clear, the present disclosure is not limited to storing/organizing the reference inspection data in a database. The aforesaid reference inspection data may, for example, be represented by one or more algorithmic expressions, or may be utilized with one or more algorithmic expressions, or may be organized in other known data collection format, or may be used to produce a graphical solution, or the like or any combination thereof. In some embodiments, the above process of producing reference inspection data can be repeated on each of the plurality of grooves on "N" number of reference male spline members 48 (where "N" is an integer) until an amount of reference inspection data is produced that is statistically sufficient for quality assurance. The reference inspection data may be further processed (e.g., determination of standard deviations, linear interpolation, polynomial interpolation, etc.) to facilitate its use in the correction module 44.

The inspection data from the gaging process and from the CMM module 40 may be correlated with one another and thereby establish a relationship between inspection data determined using known gaging (or independent CMM) processes and inspection data produced by the CMM module 40 of the CNC machine tool 36. In this manner, a CNC machine tool 36 with a CMM module 40 can be "calibrated" for production of a particular component.

During a production run of male spline members 48 (or other components) for example, the CMM module 40 of a calibrated CNC machine 36 can be used to inspect each male spline member 48 at various steps (e.g., cuts) in the manufacturing process. The CMM module inspection data produced during production of that male spline member 48 can then be evaluated by the correction module 44 using the correlated reference inspection data. This may be referred to as a "closed door" process that is automated and does not require manual gaging or other manual inspection process. The component inspection performed using the CMM module 40 of the calibrated CNC machine tool 36 takes a fraction of the time that would be expended to manually inspect the component and minimizes or eliminates the possibility of human error/variability that may occur during a manual gaging process.

The stored instructions used to perform the evaluation may include variance thresholds, or acceptable values ranges, or the like. If the CMM module inspection data produced during production of that male spline member 48 is within the applicable variance threshold or range, then the groove cutting process may be continued. On the other hand, if the CMM module inspection data produced during production of that male spline member 48 is outside of applicable variance threshold or range, then correction module 44 may be utilized to produce corrective action instructions.

The stored instructions may use the correction module reference inspection data (which correlates CMM module measurement data to known gaging process inspection data)

to determine the amount of variance to component specification, e.g., the amount of positional variance of a semi-finish surface point along the X-axis, the Y-axis, and/or the Z-axis relative to a target profile. The instructions may then use the determined variance data to define a corrective action, e.g., a machining action that places the component feature being machined back within acceptable variance so that further machining processes can be performed to produce an acceptable component. As stated above, this is an automated "closed door" process that does not require manual intervention, takes a fraction of the time that would be expended to manually inspect the component and perform a correction, and minimizes or eliminates the potential for human error.

Figure 6:
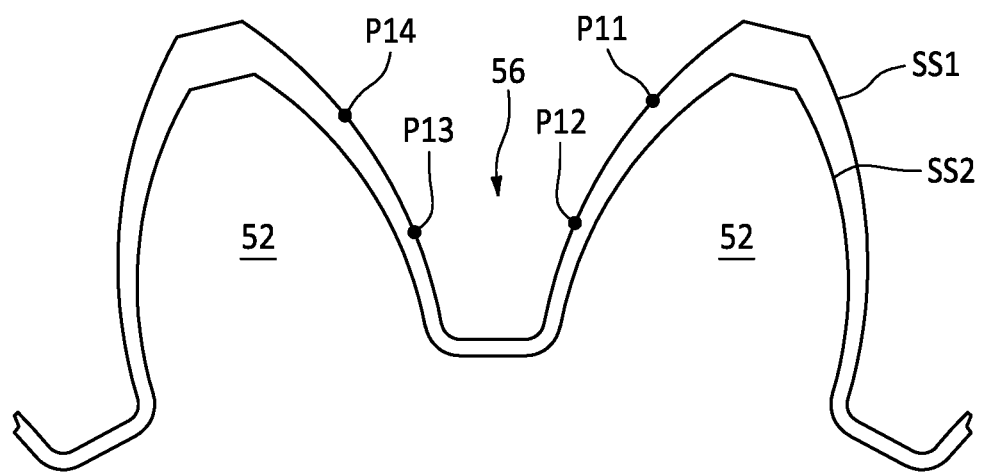
FIG. 6 is a diagrammatic partial view of a male spline member being manufactured.

To illustrate, reference is made to the diagrammatic planar view of a male spline member groove 56 disposed between a pair of male spline member teeth 52 shown in FIG. 6. The diagram illustrates a surface SS1 representing a semi-finished shape of the male spline member groove 56 and a surface SS2 from a digital model representing the finished shape of the male spline member groove 56. After the semi-finished shape is produced in the male spline member 48, the CNC machine CMM module 40 may be utilized to identify a plurality of inspection points P11, P12, P13, P14 on the surface SS1. The number of inspection points chosen in this process can vary but is selected to provide at least an acceptable amount of inspection information. The CCM module inspection data associated with points P11, P12, P13, P14 may then be evaluated relative to the corresponding stored reference inspection data to determine the actual position of the inspection points and whether the actual positions are within acceptable variance for the groove 56 at that step of the machining process. In those correction module embodiments that utilize digital models, the CCM module inspection data associated with points P11, P12, P13, P14 can be evaluated relative to the corresponding points on the digital model (i.e., surface SS2) to ascertain whether points P11, P12, P13, P14 are within acceptable variance or not (e.g., is the semi-finished shape SS1 skewed or otherwise misaligned relative to the surface SS2 of the finished shape of the male spline member groove). If the aforesaid points are outside of acceptable variance, then corrective action instructions (e.g., corrected tool path, etc.) may be determined to modify the surface SS1 to permit the finished surface SS2 to be achieved. If the points P11, P12, P13, P14 on semi-finished surface SS1 are within acceptable variance, then the next step in the formation of the male spline member groove 56 can be performed without corrective action.

Figure 7:
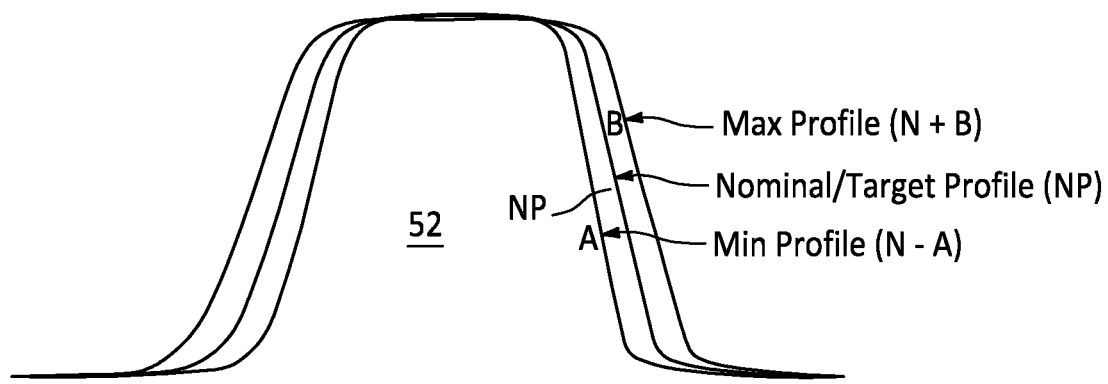
FIG. 7 diagrammatically illustrates a spline tooth having a nominal profile, a maximum profile, and a minimum profile.
Figure 8:
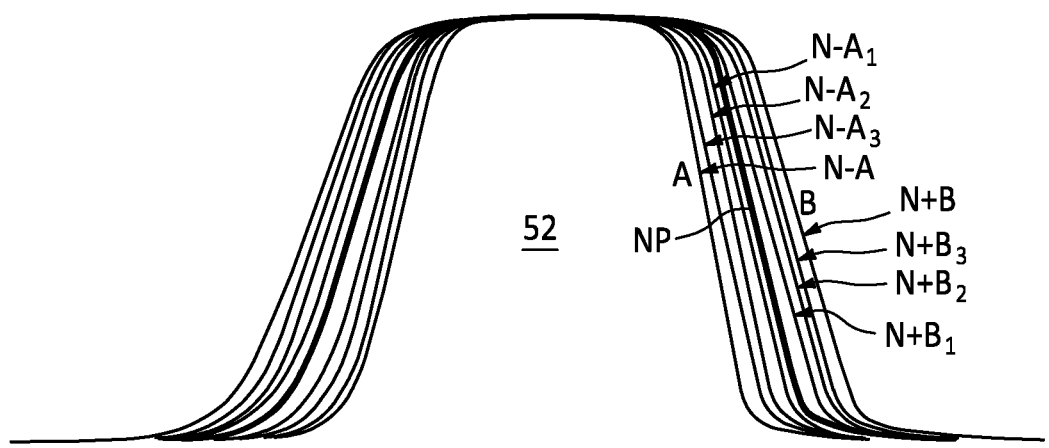
FIG. 8 diagrammatically illustrates the spline tooth shown in FIG. 7, now including a plurality of intermediary spline tooth profiles.
Figure 9:
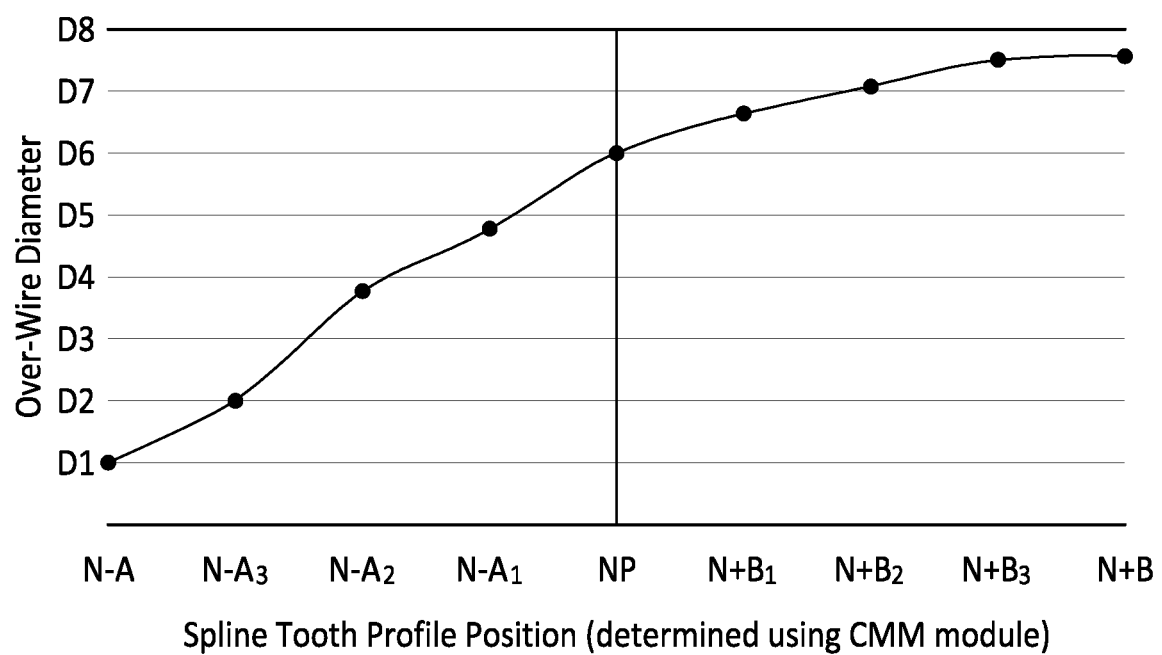
FIG. 9 is a graph of over-wire diameter versus spline tooth profile position.

FIGS. 7-9 illustrate an example of how instructions of at least a portion of a corrective action may be determined. FIG. 7 diagrammatically illustrates a spline tooth 52 having a nominal profile (sometimes referred to as a "target profile") "NP", a maximum profile "N+B", and a minimum profile "N−A". FIG. 8 diagrammatically illustrates the spline tooth 52 shown in FIG. 7 with the respective profiles NP, N+B, N−A, and a plurality of intermediary spline tooth profiles, i.e., $N-A_1$, $N-A_2$, $N-A_3$, $N+B_1$, $N+B_2$, $N+B_3$. The correction module reference inspection data includes data for each of these spline tooth profiles. FIG. 9 is a graph of over-wire diameter versus spline tooth profile position as determined by a CNC machine CMM module 40. FIG. 9 illustrates that the over-wire diameter at the spline tooth nominal profile (NP) correlates to an over-wire diameter of D6. If upon inspection of the spline tooth 52 using the CNC machine CMM module 40, the correction module 44 determines that the actual spline tooth profile (e.g., $N+B_3$) correlates to an over-wire diameter of D7, and the over-wire diameter of D7 is outside of acceptable variance, the correction module 44 may determine corrective action instructions (e.g., using the graphed relationship) for altering the actual spline tooth profile to one that correlates to an over-wire diameter of D6 (e.g., D7–D6) thereby modifying the spline tooth profile back into conformance and facilitating further manufacturing steps as may be required. As stated above, the embodiments of the present disclosure may include a correction module 44 that includes a database or other known data collection formats, one or more algorithmic expressions, graphical solutions, or any combination thereof. The above-described methodology is a non-limiting example of how a graphical solution, or an algorithmic solution (representative of the graphical solution) may be utilized.

Figure 10:
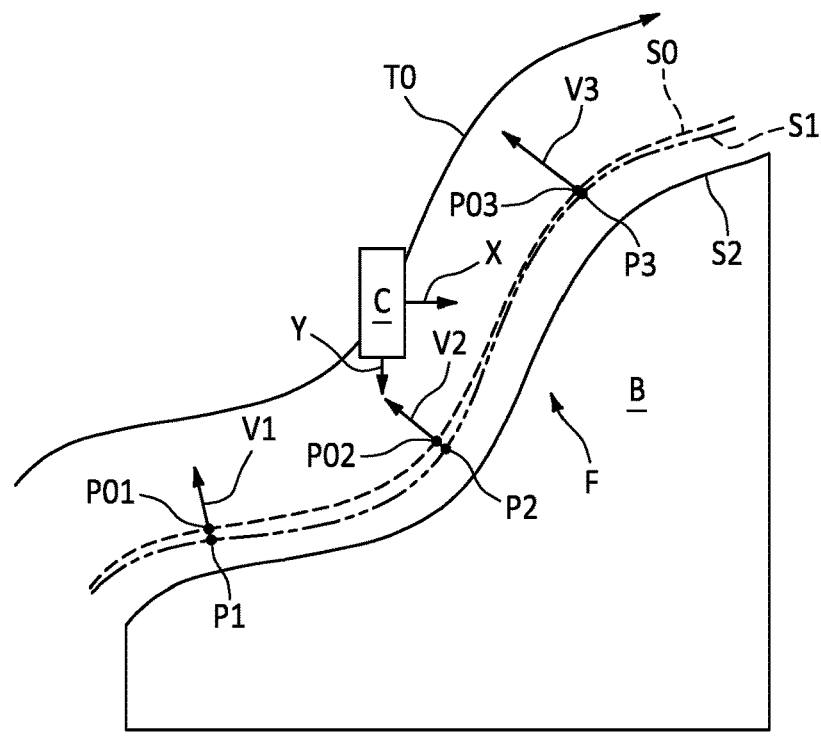
FIG. 10 is a diagrammatic view of a feature portion of a component being formed with a CNC machine tool, including a modeled surface of the semi-finished shape of the feature and the actual surface of the semi-finished shape of the feature.

Referring now to FIG. 10, a further example of the present disclosure is provided. In this example, a feature F portion of a component B is diagrammatically shown being formed with a CNC machine cutting tool C. A semi-finished shape of the feature F is produced by moving the cutting tool C relative to the component B along a tool path TO. In FIG. 10, the dashed line S0 represents a modeled surface of the semi-finished shape of feature F as may be defined by a digital model stored in the instructions. The dashed line S1 represents the actual surface of the semi-finished shape of Feature F as determined by the CMM module 40. As can be seen in FIG. 10, lines S0 and S1 vary from one another. The variations between the modeled shape of the semi-finished feature surface and the actual surface of the semi-finished feature may result from a variety of different factors, e.g., tolerancing, cutting tool wear or damage, etc.

The aforesaid variations (e.g., actual vs. modeled) may be identified during an inspection of the semi-finished feature surface using the CNC machine CMM module 40. For example, a probe portion of the CMM module 40 may identify a plurality of inspection points P1, P2, P3 on the actual surface S1 and communicate multi-dimensional coordinate data relating to those inspection points P1, P2, P3 to the correction module 44. The correction module 44 may then analyze that inspection point coordinate data using the stored reference inspection data to establish a relationship, for example, between the inspection point coordinate data and the modeled shape of the semi-finished surface to determine the magnitude of the variances therebetween. For example, the correction module 44 may determine inspection point coordinate data for model points P01, P02, P03 on the modeled surface S0 that correspond to inspection points P1, P2, P3 on the actual surface S1 of the semi-finished shape. In this example, the variances between the actual inspection points P1, P2, P3 and the model points P01, P02, P03 are outside of acceptable variance. Stored instructions will therefore cause the correction module 44 to produce corrective action instructions. The respective S0/S1 variances may be represented as vectors V1, V2, V3 that extend normal to the actual surface S1 at the inspection points P1, P2, P3 to the model points P01, P02, P03 on the modeled surface S0. These vectors V1, V2, V3 (shown outside of the variance between S0 and S1 to facilitate viewing) may be utilized within corrective action instructions to produce a corrected tool path for the cutting tool C that deviates from a nominal tool path that would be used in the absence of variances. The corrected tool path will facilitate achievement of the finished shape (e.g., surface S2) of the feature F.

Figure 11:
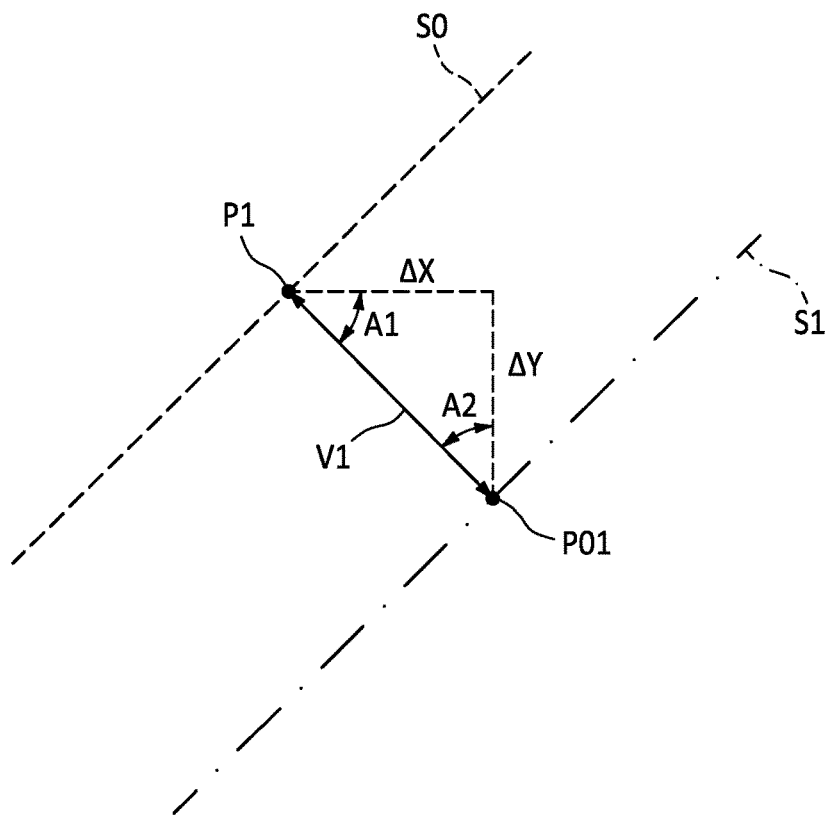
FIG. 11 is a diagrammatic view of the feature including the actual surface S1 of the semi-finished feature having inspection point P1 and the modeled surface S0 having model point P01.

The following is a non-limiting specific example of how corrective action instructions may be produced by the correction module. FIG. 11 illustrates an enlarged diagrammatic view of the feature F including the actual surface S1 of the semi-finished feature having inspection point P1 and the modeled surface S0 having model point P01 and the variance therebetween. The vector V1 is normal to the actual surface S1 of the semi-finished feature F and extends between P1 and model point P01 on the modeled surface S0. The magnitude of the variance between the inspection point P1 and the model point P01 may be evaluated to determine if it is within acceptable tolerance. In some embodiments, depending on the magnitude of the variance or the nature of the variance, the present disclosure system may provide a user indication (e.g., a "flag") that a manufacturing issue (e.g., a chipped, damaged, or excessively worn cutting tool) may exist that requires further investigation. Hence, aspects of the present disclosure system may include a machine tool diagnostic capability. If the magnitude of the variance between the inspection point P1 and the model point P01 is greater than acceptable tolerance, the instructions may cause the determination of orthogonal components (e.g., $\Delta X$, $\Delta Y$) of the variance as represented by the vector V1. For example, the X-axis component of vector V1 may be determined by multiplying the magnitude of vector V1 (i.e., the distance between point P1 and point P01) by the cosine of the angle A1 disposed between vector V1 and a line parallel to the X axis. In similar fashion, the Y-axis component of vector V1 be determined by multiplying the magnitude of vector V1 by the cosine of the angle A2 disposed between vector V1 and a line parallel to the Y axis. These determined orthogonal values, in turn, may be used to produce the corrective action instructions to modify the operation of the cutting tool C (e.g., modify the cutting tool path) to facilitate achievement of the finished shape (e.g., surface S2) of the feature F.

As can be seen from the above examples, the present disclosure provides a "closed-door" process that is automated and does not require manual gaging or other manual inspection process during component production. The component inspection performed using the CMM module 40 of the calibrated CNC machine tool 36 during this closed-door process takes a fraction of the time that would be expended to manually inspect the component and minimizes or eliminates the possibility of human error/variability that may occur during a manual gaging process.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details. The description herein uses splined coupling members, CNC milling machines, certain types of CMM modules 40 (e.g., contact probes, non-contact probes), and describes the use of certain known metrology techniques (e.g., over-wire measurements) to illustrate the present disclosure. As stated above, these examples are provided to illustrate applications of the present disclosure and the present disclosure is not intended to be limited to these examples.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A system for manufacturing a component, comprising:
   a computer numerical control (CNC) machine tool having a machining module selectively controllable to machine the component and a coordinate measuring machine (CMM) module that is selectively controllable to determine a set of multi-axis coordinates for one or more surface points on the component;

a correction module in communication with the CMM module and the correction module is in communication with stored reference inspection data relating to the component; and a system controller in communication with the CNC machine tool, the correction module, and non-transitory memory storing instructions, which instructions when executed cause the system controller to:
(a) control the CNC machine tool to modify at least one surface of the component;
(b) control the CMM module to determine said multi-axis coordinates for the one or more surface points on the modified surface of the component;
(c) determine one or more surface position variances using the reference inspection data and using the multi-axis coordinates for the one or more surface points on the modified surface;
(d) determine if any of the one or more surface position variances exceed a threshold; and
(e) using the correction module, create one or more executable correction action instructions for controlling the CNC machine if the one or more surface position variances exceed the threshold; and
(f) repeat steps (a) through (e) until the one or more surface position variances are within the threshold.

2. The system of claim 1, wherein the stored reference inspection data relating to the component includes a set of multi-axis coordinates for one or more surface points on at least one reference component produced using the CMM module correlated with dimensional data relating to the at least one reference component produced using a gaging process.

3. The system of claim 2, wherein the gaging process is an over-wire measurement process.

4. The system of claim 2, wherein the gaging process includes using a coordinate measuring machine independent of the CNC machine tool.

5. The system of claim 2, wherein the CNC machine is a CNC milling machine.

6. The system of claim 5, wherein the instructions when executed that cause the system controller to control the CNC milling machine may include controlling the CNC milling machine to remove material from the component and thereby produce the modified surface of the component.

7. The system of claim 5, wherein the correction action instructions are operable to modify a tool path followed by a cutting tool of the CNC milling machine.

8. The system of claim 6, wherein the instructions when executed cause the system controller to control the CNC milling machine to produce a male spline member having a plurality of circumferentially disposed male spline member grooves and male spline member teeth.

9. A method for manufacturing a component using a computer numerical control (CNC) machine tool having a machining module selectively controllable to machine the component and a coordinate measuring machine (CMM) module that is selectively controllable to determine a set of multi-axis coordinates for one or more surface points on the component, the method comprising:
(a) controlling the CNC machine tool to modify at least one surface of the component;
(b) controlling the CMM module to determine multi-axis coordinates for one or more surface points on the modified surface of the component;
(c) determining one or more surface position variances using the reference inspection data and using the multi-axis coordinates for the one or more surface points on the modified surface;
(d) determining if any of the one or more surface position variances exceeds a threshold;
(e) creating one or more executable correction action instructions for controlling the CNC machine if the one or more surface position variances exceed the threshold; and
(f) repeating steps (a) through (e) until the one or more surface position variances are within the threshold.

10. The method of claim 9, wherein the stored reference inspection data relating to the component includes a set of multi-axis coordinates for one or more surface points on at least one reference component produced using the CMM module correlated with dimensional data relating to the at least one reference component produced using a gaging process.

11. The method of claim 10, wherein the gaging process is an over-wire measurement process.

12. The method of claim 10, wherein the gaging process includes using a coordinate measuring machine independent of the CNC machine tool.

13. The method of claim 9, wherein the step of controlling the CNC machine tool to modify at least one surface of the component includes controlling the CNC milling machine to remove material from the component to produce the modified surface of the component.

14. The method of claim 12, wherein the CNC machine is a CNC milling machine.

15. The method of claim 14, wherein the correction action instructions are operable to modify a tool path followed by a cutting tool of the CNC milling machine.

* * * * *